United States Patent [19]
Parks et al.

[11] Patent Number: 6,093,274
[45] Date of Patent: Jul. 25, 2000

[54] METHOD OF MAKING A COMPOSITE PAPERBOARD STRUCTURE WITH A SILICON-OXIDE-COATED FILM FOR IMPROVING THE SHELF LIFE OF OXYGEN-SENSITIVE PRODUCTS

[75] Inventors: Christopher Jude Parks, Ellicott City, Md.; Ralph Scott Peterson, Clifton Forge, Va.

[73] Assignee: Westvaco Corporation, New York, N.Y.

[21] Appl. No.: 08/946,949

[22] Filed: Oct. 9, 1997

Related U.S. Application Data

[63] Continuation of application No. 08/595,851, Feb. 2, 1996, abandoned.

[51] Int. Cl.⁷ ..................................................... B29B 1/00
[52] U.S. Cl. .................. 156/243; 156/244.23; 156/280; 426/127; 428/34.2; 428/430
[58] Field of Search ..................................... 156/280, 243, 156/244.23; 428/34.2, 430; 426/127

[56] References Cited

U.S. PATENT DOCUMENTS

| | | | |
|---|---|---|---|
| Re. 33,376 | 10/1990 | Gibbons et al. . | |
| 4,455,184 | 6/1984 | Thompson | 156/244.23 |
| 4,702,963 | 10/1987 | Phillips et al. . | |
| 4,789,575 | 12/1988 | Gibbons et al. . | |
| 4,802,943 | 2/1989 | Gibbons et al. . | |
| 4,835,025 | 5/1989 | Thompson et al. | 428/34.2 |
| 4,861,526 | 8/1989 | Gibbons et al. . | |
| 4,948,640 | 8/1990 | Gibbons et al. . | |
| 5,084,356 | 1/1992 | Deak et al. . | |
| 5,085,904 | 2/1992 | Deak et al. . | |
| 5,112,424 | 5/1992 | Cook | 156/243 |
| 5,122,410 | 6/1992 | Lofgren et al. . | |
| 5,296,070 | 3/1994 | Take et al. | 156/244.11 |
| 5,314,561 | 5/1994 | Komiya . | |
| 5,387,449 | 2/1995 | Kunz et al. . | |
| 5,462,779 | 10/1995 | Misiano et al. | 428/430 |
| 5,491,018 | 2/1996 | Maro et al. . | |
| 5,508,075 | 4/1996 | Roulin et al. . | |
| 5,772,819 | 6/1998 | Olvey | 156/244.23 |

FOREIGN PATENT DOCUMENTS

| | | |
|---|---|---|
| 667302A1 | 8/1995 | European Pat. Off. . |
| 5-8318 | 1/1993 | Japan ..................................... 156/280 |
| 6-56164 | 3/1994 | Japan . |
| WO92 01558 | 2/1992 | WIPO . |

OTHER PUBLICATIONS

Transparent, flexible barrier films of 4P–Casestudy–Gerhard Bayer and Roger Lennard, 4P Verpackungen Ronsberg, Barrier–Pack II London 1Jun. 10–11, 1991.

European Launch for 'glass' coated films, (PW Info No. 76), Packaging Week, Oct. 9, 1991, p. 5.

European Launch for 'glass' coated films, (PW Infor No. 76), Packaging Week, Oct. 9, 1991, p. 5.

'Glass–coated film' from 4P is set for German Launch, (PW Info No. 24), Packaging Week, Nov. 20, 1991, p. 5.

Eine Idee gewinnt Gestalt, Von Dr Joachim Nentwig, Neue Verpackung, May, 1993, no translation.

Away from the limelight, Julian Hunt, (PW Info No. 11), Packaging Week, Jan. 27, 1994, p. 26.

Bid to develop barrier films for drinks cartons, Julian Hunt, Packaging Week, Mar. 10, 1994.

Tetra Pak Debuts Glassy–Coated Gabletop Cartons for Juice, Packaging Strategies, Nov. 15, 1994.

Transparent $SiO_2$ barrier coatings: conversion and production status, TAPPI Journal, Jan. 1995vol. 78, No. 1, pp. 161–165.

Glass–Coated Packaging Films Ready for Commercialization, Packaging Technology & Engineering, Jun./Jul. 1995, pp. 36–43.

SiOx coating ups shelf life, Packaging Digest, Dec., 1995.

*Primary Examiner*—John J. Gallagher
*Attorney, Agent, or Firm*—J. R. McDaniel; R. L. Schmalz

[57] ABSTRACT

This invention relates to paperboard composite structures with a glass-coated film. Such structures of this type, generally, improve the shelf life of refrigerated and other oxygen-sensitive products and provide a barrier to flavors and fragrances to maintain product quality.

3 Claims, 1 Drawing Sheet

FIG. 1
- 4 — LDPE
- 6 — BOARD
- 8 — EnBA
- 10 — PET-GLASS
- 12 — EnBA
- 14 — LDPE

FIG. 2
- 4 — LDPE
- 6 — BOARD
- 32 — LDPE
- 10 — PET-GLASS
- 12 — EnBA
- 14 — LDPE

FIG. 3
- 4 — LDPE
- 6 — BOARD
- 32 — LDPE
- 10 — PET-GLASS
- 12 — EnBA
- 14 — LDPE
- 42 — EVOH

FIG. 4
- 4 — LDPE
- 6 — BOARD
- 8 — EnBA
- 10 — PET-GLASS
- 12 — EnBA
- 14 — LDPE
- 42 — EVOH

FIG. 5
- 4 — LDPE
- 6 — BOARD
- 32 — LDPE
- 62 — EnBA
- 10 — PET-GLASS

FIG. 6
- 4 — LDPE
- 6 — BOARD
- 32 — LDPE
- 10 — PET-GLASS

FIG. 7
- 4 — LDPE
- 6 — BOARD
- 8 — EnBA
- 10 — PET-GLASS

FIG. 8
- 4 — LDPE
- 6 — BOARD
- 8 — EnBA
- 92 — PET-GLASS-PVDC

METHOD OF MAKING A COMPOSITE PAPERBOARD STRUCTURE WITH A SILICON-OXIDE-COATED FILM FOR IMPROVING THE SHELF LIFE OF OXYGEN-SENSITIVE PRODUCTS

This application is a Continuation of application Ser. No. 08/595,851, filed Feb. 2, 1996, now abandoned.

BACKGROUND OF THE INVENTION

1. Field of the Invention

This invention relates to paperboard composite structures incorporating a silicon-oxide ("glass")-coated film. Structures of this type generally improve the shelf life of refrigerated juices and other oxygen-sensitive products and provide a barrier to flavors and fragrances to maintain product quality.

2. Description of the Related Art

One criterion for determining the end of the shelf life of refrigerated juices and other oxygen-sensitive products is the Vitamin C content of the product. Because Vitamin C is easily oxidized, the oxygen barrier of the carton is one predictor of shelf life. Studies have shown that carton barrier is a function of the oxygen permeability of the laminate and of the "leakage" through the seals and seams of the carton.

It is known that currently available cartons with ethylene-vinyl alcohol (EVOH) or nylon as the barrier layer, formed and filled on standard filling lines, provide about eight weeks of shelf life for orange juice. However, it is well known that EVOH is sensitive to humidity and loses much of its oxygen barrier at high humidity which is typical of the refrigerated storage of liquids. Also, EVOH is sensitive to sealing temperatures and has a relatively narrow window of sealability.

It is also known to use aluminum foil in barrier packaging. While aluminum foil is an excellent barrier, it is expensive and makes recycling or incineration of the used containers more difficult.

Finally, the use of gable top cartons incorporating glass-coated film, instead of aluminum foil barriers has been developed, as set forth in an article entitled *"SiOx coating ups shelf life", Packaging Digest®*, dated December 1995. The glass-coated film is located between plies of polyethylene (PE) on the outside of the paperboard cartons. The paperboard cartons employ an inner lining of PE. While these cartons employ the advantageous silicon oxide layer, the silicon oxide layer must be located as close to the food product as possible in order to best retain the Vitamin C within the product and, thus, increase the shelf life of the food product within the container. Therefore, a more advantageous container will be presented if the glass-coated film were located as close as possible to the food product located within the container.

It is also known in U.S. Pat. No. 5,296,070 ('070), to Take et al., entitled "Process For Producing Liquid Container Material," that the resins which contact the glass coating need to be cooled to below 194° F. (90° C.) and preferably below 122° F. (50° C.) in order to avoid cracking.

It is apparent from the above that there exists a need in the art for a paperboard container which is economical to construct, but which at the same time substantially increases the shelf life of the food product contained within the container. It is the purpose of this invention to fulfill this and other needs in the art in a manner more apparent to the skilled artisan once given the following disclosure.

SUMMARY OF THE INVENTION

Generally, speaking, this invention fulfills these needs by providing a composite paperboard laminate comprised of: a first heat sealable polymer layer; a paperboard substrate located interior to the first polymer layer; a second polymer layer located interior to the paperboard substrate; and a glass-coated film layer located interior to the second polymer layer having a matrix of silicon oxide and a carrier polymer such that the silicon oxide is located interior to the carrier polymer.

In certain preferred embodiments, the first polymer is a heat sealable low density polyethylene (LDPE). The second polymer layer can be either Ethylene normal Butyl Acrylate (EnBA) or LDPE. The glass-coated film is a matrix of silicon oxides ($SiO_x$, where $1.0<x<2.0$) applied to a polymer film by one of several techniques. Any one of several polymers such as polyethylene terephthalate (PET) or polypropylene (PP) are used as a carrier. Finally, an additional polymer layer and another heat sealable layer may be added on top of the glass-coated film such that these extra layer(s) are located adjacent to the food product located within the container.

In another further preferred embodiment, the composite paperboard laminate improves the shelf life of the refrigerated and other oxygen-sensitive products while providing a barrier to flavors and fragrances to maintain product quality.

The preferred composite paperboard container, according to this invention, offers the following advantages: ease of assembly; increased shelf life; increased barrier properties; good stability; good durability; and excellent economy. In fact, in many of the preferred embodiments, the factors of ease of assembly, increased shelf life, improved barrier properties, and excellent economy are optimized to an extent that is considerably higher than heretofore achieved in prior, known composite paperboard containers.

The above and other features of the present invention which will become more apparent as the description proceeds are best understood by considering the following detailed description in conjunction with the accompanying drawings, wherein like characters represent like parts throughout the several views and in which:

A BRIEF DESCRIPTION OF THE DRAWINGS

FIG. 1 is a cross-sectional view of a composite paperboard laminate, according to the present invention;

FIG. 2 is a cross-sectional view of another composite paperboard laminate, according to the present invention;

FIG. 3 is a cross-sectional view of another composite paperboard laminate, according to the present invention;

FIG. 4 is a cross-sectional view of another composite paperboard laminate, according to the present invention;

FIG. 5 is a cross-sectional view of another composite paperboard laminate, according to the present invention;

FIG. 6 is a cross-sectional view of another composite paperboard laminate, according to the present invention;

FIG. 7 is a cross-sectional view of another composite paperboard laminate, according to the present invention; and FIG. 8 is a cross-sectional view of another composite paperboard laminate, according to the present invention.

DETAILED DESCRIPTION OF THE INVENTION

With reference first to FIG. 1 there is illustrated a cross-sectional view of composite paperboard laminate 2. Laminate 2 includes, in part, heat sealable polymer layer 4, paperboard layer 6, polymer layer 8, glass-coated film layer 10, polymer layer 12, and heat sealable polymer layer 14.

In particular, heat sealable polymer layer 4 is, preferably, constructed of LDPE. Polymer layer 8, preferably, is constructed of EnBA. Glass-coated film layer 10, preferably, is a matrix of silicon oxides ($SiO_x$, where $1.0<x<2.0$) applied to the polymer film by one of several techniques. Most commonly, a conventional plasma deposition or evaporation deposition is employed to produce the glass-coated film layer 10. Several polymers can be employed as carriers of the glass coating. The most common polymers currently employed are polyethylene terephthalate (PET), polypropylene (PP), or polyethylene (PE). The glass-coating can be on either side of the carrier film but, preferably, the glass-coating is on the side of the carrier facing away from the board. Polymer layer 12, preferably, is constructed of Ethylene-normal-Butyl Acrylate (EnBA). Finally, heat sealable polymer layer 14, preferably, is constructed of LDPE. It is to be understood that layers 12 and 14 may be coextruded.

The lamination is accomplished by employing an appropriate polymer to provide excellent adhesion between the film and the paperboard. Corona and/or flame treatment of one or both surfaces of the film 10 and/or paperboard 6 may be used to improve adhesion. The composite paperboard laminate can then be overcoated on the film side to provide improved heat sealability such as the addition of layers 12 and 14 but would not have to be for all applications. The use of a polyester film as the carrier layer of the glass-coated film 10 should provide improved carton integrity due to the toughness of the polyester.

FIG. 2 illustrates a composite paperboard laminate 30. Laminate 30 includes, in part, heat sealable polymer layer 4, paperboard 6, polymer layer 32, glass-coated film layer 10, polymer layer 12 and heat sealable polymer layer 14. Layers 4, 6, 10, 12 and 14, preferably, are constructed of the same materials as discussed earlier with respect to FIG. 1. Layer 32, preferably, is constructed of LDPE.

FIG. 3 illustrates composite paperboard laminate 40. Laminate 40 includes, in part, heat sealable polymer layer 4, paperboard 6, polymer layer 32, glass-coated film layer 10, polymer layer 12, heat sealable layer 14, and product contact layer 42. Layers 4, 6, 10, 12 and 14, preferably, are constructed of the same materials as discussed earlier with respect to FIG. 1. Polymer layer 32, preferably, is constructed of the same materials as layer 32 in FIG. 2. Product contact layer 42, preferably, is constructed of ethylene-vinyl alcohol (EVOH) and provides an improved flavor barrier.

FIG. 4 illustrates composite paperboard laminate 50. Laminate 50 includes, in part, heat sealable polymer layer 4, paperboard 6, polymer layer 8, glass-coated film layer 10, polymer layers 12 and 14 and product contact layer 42. Layers 4, 6, 8, 10, 12 and 14, preferably, are constructed of the same materials as layers 4, 6, 8, 10, 12 and 14 in FIG. 1. Finally, layer 42 is constructed of the same material as layer 42 in FIG. 3.

FIG. 5 illustrates composite paperboard laminate 60. Laminate 60 includes, in part, heat sealable layer 4, paperboard 6, polymer layer 32, polymer layer 62 and glass-coated film layer 10. Layers 4, 6 and 10, preferably, are constructed of the same materials as layers 4, 6 and 10 in FIG. 1. Polymer layer 32, preferably, is constructed of the same material as layer 32 in FIG. 2. Finally, polymer layer 62, preferably, is constructed EnBA. It is to be understood that layers 32 and 62 can be coextruded.

FIG. 6 illustrates composite paperboard laminate 70. Laminate 70 includes, in part, heat sealable polymer layer 4, paperboard 6, polymer layer 32, and glass-coated film layer 10. Layers 4, 6 and 10, preferably, are constructed of the same materials as layers 4, 6 and 10 in FIG. 1. Polymer layer 32, preferably, is constructed of the same material as polymer layer 32 in FIG. 2.

FIG. 7 illustrates composite paperboard laminate 80. Laminate 80 includes, in part, heat sealable polymer layer 4, board 6, polymer layer 8, and glass-coated film layer 10. Layers 4, 6, 8 and 10, preferably, are constructed of the same materials as layers 4, 6, 8 and 10 in FIG. 1.

Finally, FIG. 8 illustrates composite paperboard laminate 90. Laminate 90 includes, in part, heat sealable polymer layer 4, board 6, polymer layer 8, and glass-coated film layer 92. Layers 4, 6, and 8, preferably, are constructed of the same materials as layers 4, 6, and 8 in FIG. 1. Layer 92, preferably, is constructed of a polyester film which has been coated on one side with the silicon oxide matrix and on the other side with polyvinylidene chloride (PVdC). The PVdC is used to enhance the flavor barrier.

It is to be understood that while specific coatings and coating techniques have been described, many other suitable coatings and coating techniques may be used in order to provide the proper shelf life and to improve barrier properties of the composite paperboard laminate container.

The unique properties of the glass-coated film/paperboard laminate will now be further discussed in conjunction with the accompanying examples and discussions which appear below.

EXAMPLE 1

Glass-coated film was obtained from Mitsubishi Gas Chemical Company. The film carried the tradename Techbarrier H. The oxygen permeability of the film before lamination to board was measured as 0.043 cc/100 sq. in./day at room temperature and 80 percent relative humidity.

EXAMPLE 2

The structure LDPE/board/ENBA/glass-coated film/ENBA/LDPE was made in a three step process. The film was extrusion laminated to milk carton board with the glass-coating toward the board with ENBA as the laminating resin. The board was flame treated prior to lamination. The melt temperature of the ENBA resin was 620° F. In this case the hot resin contacted the glass coating on the film. The film was then overcoated with a coextrusion of ENBA/LDPE with both resins at melt temperatures of 620° F. The film was corona treated and flame-treated prior to being overcoated. Finally, the opposite side of the milk carton board was coated with LDPE at a melt temperature of 620° F. The board was flame-treated prior to being coated. Four samples of the laminate were tested for oxygen permeability. Values were 1.77, 1.87, 2.16, and 2.26 cc/100 sq. in./day at room temperature and 80 percent relative humidity. The lamination process had an extremely negative impact on the oxygen permeability of the glass-coated film.

EXAMPLE 3

The structure LDPE/board/ENBA/glass-coated film/ENBA/LDPE was made in a three step process. The film was extrusion laminated to milk carton board with the glass-coating facing away from the board with ENBA as the laminating resin. The board was flame treated prior to lamination. The melt temperature of the ENBA resin was 620° F. In this case, the hot resin did not contact the glass coating on the film. The glass-coated side of the film was then overcoated with a coextrusion of ENBA/LDPE with both resins at melt temperatures of 620° F. The hot resin came into contact with the glass coating but the film was already securely bonded to the board. The film was corona treated and flame-treated prior to being overcoated. Finally, the opposite side of the milk carton board was coated with LDPE at a melt temperature of 620° F. The board was flame-treated prior to being coated. Four samples of the laminated were tested for oxygen permeability. Values were 0.17, 0.23, 0.30, and 0.35 cc/100 sq. in./day at room temperature and 80 percent relative humidity. The lamination process in this case had a much smaller negative impact on the oxygen permeability of the film than the lamination process of Example 2.

EXAMPLE 4

The laminate of Example 2 was used to manufacture half-gallon gable-top juice cartons. These and a three variations of juice cartons with amorphous nylon incorporated as oxygen barrier were filled with juice blends containing Vitamin C. Vitamin C levels were monitored over eight weeks. Results are shown in Table 1.

TABLE 1

Comparison of Vitamin C retention for cartons incorporating a glass-coated film as oxygen barrier and cartons incorporating nylon as oxygen barrier. (glass toward board)

| carton style | eight week Vitamin C retention blend 1 | eight week Vitamin C retention blend 2 |
| --- | --- | --- |
| nylon 1 | 80% | 65% |
| nylon 2 | 77% | 31% |
| nylon 3 | 80% | 56% |
| glass-coated film | 81% | 64% |

The data show that the glass-coated film was about equal to the best of the nylon constructions. This is not surprising given the permeability values of Example 2. The permeability of the nylon structure is about 2.5 cc/100 sq. in./day making it only slightly worse than the permeability of the glass-coated film structure used in this example.

EXAMPLE 5

A laminate similar to that of Example 3 was manufactured. The only difference between this laminate and that of Example 3 was that no corona treatment was used in the present example. Permeability measurements on that structure were 0.1, 0.2, 0.5 and 0.9 cc/100 sq. in./day. These values are in fairly good agreement with those of Example 3.

EXAMPLE 6

The laminate of Example 5 was made into juice cartons. These were filled with orange juice and Vitamin C was measured over a period of twelve weeks. Two sets of each type of carton were filled. Results after 9 weeks and after 12 weeks are given in Table 2.

TABLE 2

Comparison of Vitamin C retention for cartons incorporating a glass-coated film as oxygen barrier and cartons incorporating nylon as oxygen barrier. (glass away from board)

| carton style | 9 week Vitamin C retention | 12 week Vitamin C retention |
| --- | --- | --- |
| nylon 1 | 55% | 49% |
| nylon 2 | 55% | 48% |
| glass-coated film 1 | 66% | 61% |
| glass-coated film 2 | 61% | 60% |

This data show that the glass-coated film structure provided significantly higher Vitamin C retention than did the nylon structure. This is apparently the result of the low permeability of this structure. The low permeability was maintained by proper handling and orientation of the glass-coated film during the lamination process.

In short, the glass-coated film is incorporated into the structure

HS1/board/A1/film/A2/HS2 in which HS1 and HS2 are heat-sealable polymers, A1 and A2 are adhesive polymers, and film is the glass-coated film. Note that HS1 and HS2 are not necessarily the same heat seal polymer and A1 and A2 are not necessarily the same adhesive polymer. Additionally one or both sides of the board and one or both sides of the film may be corona treated or flame treated in order to promote adhesion of the adjacent polymer layers. Additionally, the molten polymer surfaces may be ozone treated in the air gap between the die and the chill roll in order to promote adhesion. Manufacture of the above structure consists essentially of a three-step process. First, the film is extrusion laminated to the board with the adhesive layer A1. Second, the film is then overcoated with the coextrusion A2/HS2. Third, the board is coated with the heat seal polymer HS1. Additional layers can be incorporated anywhere in the structure. One example would be a thin flavor barrier layer over the HS2 layer. For certain applications in which heat sealability is not a requirement, one or both of the heat seal layers may be eliminated. The significant part of the invention is a method for combining silica-coated film with board in such a way as to maintain the benefits of the silica coating.

During the extrusion lamination step, the film comes into contact with molten polymer A1. Because, the film has such a low thermal mass, and the temperature of the molten polymer is high, the surface of the film contacting the molten polymer during this step is subject to large thermal stresses. During the coextrusion step, the board/A1/film combination is contacted by the molten polymer A2/HS2. In this step, the thermal mass of the board/A1/film combination is large and, therefore, the heat of the coextrusion is more quickly dissipated into the substrate resulting in less thermal stress than in the extrusion lamination step. For this reason, it is advantageous to laminate the glass-coated film with the glass-coated surface oriented away from the board. In this orientation, the glass-coated surface is subject to as little thermal stress as possible and the least amount of damage to barrier properties will result.

CONCLUSIONS

Cartons made from a structure incorporating silica-coated film as the oxygen barrier can provide shelf life for oxygen-sensitive products significantly better than provided by a standard nylon construction. This is due to the low permeability of this structure. The low permeability is maintained by proper handling and orientation of the glass-coated film during the lamination process.

Once given the above disclosure, many other features, modifications or improvements will become apparent to the skilled artisan. Such features, modifications or improvements are therefore, considered to be a part of this invention, the scope of which is to be determined by the following claims.

What is claimed is:

1. A method for constructing a composite paperboard laminate, wherein said method consists essentially of the steps of:

surface treating a first side of a paperboard substrate;

extruding a first melted polymer between a matrix of silicon oxides on a carrier polymer and said first side of said paperboard substrate such that said carrier polymer is located substantially adjacent to said first polymer and said first polymer is located substantially adjacent to said paperboard substrate, wherein said first polymer is ethylene normal butyl acrylate and said carrier polymer is polyethylene terephthalate;

surface treating a second side of said paperboard substrate;

coating said second side of said paperboard substrate with a first melted, heat sealable polymer wherein said first heat sealable polymer is low density polyethylene; and coating said matrix with a coextrusion of a melted second polymer and a second melted, heat sealable polymer such that said second polymer is located substantially adjacent to said matrix and wherein said second polymer is ethylene normal butyl acetate and said second heat sealable polymer is low density polyethylene.

2. The method, as in claim 1, wherein said method further includes the step of:

coating said second polymer and said second heat sealable polymer with a barrier layer.

3. The method, as in claim 2, wherein said barrier layer is of:

ethylene-vinyl alcohol.

\* \* \* \* \*

UNITED STATES PATENT AND TRADEMARK OFFICE
CERTIFICATE OF CORRECTION

PATENT NO. : 6,093,274
DATED : Jul. 25, 2000
INVENTOR(S) : Christopher Jude Parks
Ralph Scott Peterson It is certified that error appears in the above-identified patent and that said Letters Patent is hereby corrected as shown below:

Column 6, line 32, delete "molten".

Signed and Sealed this

Third Day of April, 2001

*Attest:*

NICHOLAS P. GODICI

*Attesting Officer*  *Acting Director of the United States Patent and Trademark Office*